(12) United States Patent
Nagarkar et al.

(10) Patent No.: US 8,863,304 B1
(45) Date of Patent: Oct. 14, 2014

(54) METHOD AND APPARATUS FOR REMEDIATING BACKUP DATA TO CONTROL ACCESS TO SENSITIVE DATA

(75) Inventors: Kuldeep Sureshrao Nagarkar, Pune (IN); Gaurav Malhotra, Pune (IN); Thomas G. Clifford, Edina, MN (US); Bruce Wootton, Alameda, CA (US); Aleksey Tsibulya, San Rafael, CA (US)

(73) Assignee: Symantec Corporation, Mountain View, CA (US)

( * ) Notice: Subject to any disclaimer, the term of this patent is extended or adjusted under 35 U.S.C. 154(b) by 1044 days.

(21) Appl. No.: 12/411,850

(22) Filed: Mar. 26, 2009

(51) Int. Cl.
*H04L 29/06* (2006.01)
*G06F 21/00* (2013.01)

(52) U.S. Cl.
USPC .................................. 726/27; 726/2; 713/182

(58) Field of Classification Search
CPC ... H04L 63/101; H04L 63/10; G06F 21/6245; G06F 21/60; G06F 21/62
See application file for complete search history.

(56) References Cited

U.S. PATENT DOCUMENTS

2005/0125698 A1* 6/2005 Yeates et al. .................. 713/202
2008/0091747 A1* 4/2008 Prahlad et al. ............... 707/204

OTHER PUBLICATIONS

CA ARCserve® Backup, Product Description, Copyright 2009 CA. Downloaded from web site http://arcserve.ca.com/us/products/product.aspx?id=5282 on Jun. 23, 2009.
Boodoosingh, Cliff, "New Online Backup Service Provides Protection Against Data Loss," Apr. 23, 2007. Downloaded from web site http://www.onlinebackupreviews.com/new-online-backup-service-provides-protection-against-data-loss-163.html on Jun. 23, 2009.

* cited by examiner

*Primary Examiner* — Izunna Okeke
(74) *Attorney, Agent, or Firm* — Campbell Stephenson, LLP

(57) ABSTRACT

A method and apparatus for remediating backup data to control access to sensitive data is described. In one embodiment, the method for facilitating sensitive data remediation from backup images without a separate data store includes examining the backup images to identify sensitive data and modifying remediation information associated with the sensitive data, wherein the remediation information restricts access to the sensitive data to at least one corresponding access group.

17 Claims, 4 Drawing Sheets

METHOD AND APPARATUS FOR REMEDIATING BACKUP DATA TO CONTROL ACCESS TO SENSITIVE DATA

BACKGROUND

1. Field of the Invention

Embodiments of the present invention generally relate to data leakage prevention (DLP) techniques and, more particularly, to a method and apparatus for remediating backup data to control access to sensitive data.

2. Description of the Related Art

In a typical computing environment, small to large enterprises accumulate a significant amount of computer data due to various operations (e.g., business transactions, administration, resource management, manufacturing, providing services, and/or the like). As such, the computer data is stored in various storages (e.g., a tape drive, a hard disk drive and/or the like). For example, the computer data may be backed up as a backup image on backup storage that is controlled and/or monitored by backup software. Further, the computer data may include sensitive data (e.g., trade secrets, legal documents, fiscal policies, employee's personal data (e.g., social security number, credit card number), development plans, intellectual property, critical business strategies and the like). As a result, it is highly desirable to prevent any unauthorized access and/or loss of the sensitive data.

Currently, various types of data leakage prevention (DLP) software are employed to detect and prevent the leakage of the sensitive data stored within the storage. Generally, the DLP software scans the data (e.g., a backup image) stored in the storage to determine if the storage includes the sensitive data. Consequently, on determining the sensitive data, the DLP software remediates the data by transferring it to a separate storage (e.g., remediation store).

Further, the backup image includes various data objects, which may include the sensitive data. However, the DLP software transfers the entire backup image to the remediation store, instead of transferring the one or more data objects. As a result, the entire backup image is remediated even if only a portion (e.g., one or more data objects) of the backup image contains the sensitive data.

Additionally, the DLP software provides access credentials to one or more DLP administrators that permit to access the remediated data (e.g., remediated backup image). As a result, the remediated data is inaccessible to backup administrators. As such, computer data remediation requires additional storage resources (e.g., the remediation store) that are needed to be administered separately. Hence, backup software and the DLP software cannot interact and provide access to the remediated data objects. As result, the backup administrator needs to manually communicate with the DLP administrators in order to access the remediated backup image. Subsequently, a significant amount of time and resources may be consumed in order to access the remediated backup image. Moreover, longer access times coupled with restricted access to the remediated backup image may adversely affect backup related operations, such as data restoration, data duplication, data retention and/or the like.

Therefore there is a need in the art for a method and apparatus for efficiently remediating backup data to control access to sensitive data manner and without an additional remediation store.

SUMMARY OF THE INVENTION

Embodiments of the present invention generally comprise a method and apparatus for remediating backup data to control access to sensitive data. In one embodiment, a method for facilitating sensitive data remediation from backup images without a separate data store includes examining the backup images to identify sensitive data and modifying remediation information associated with the sensitive data, wherein the remediation information restricts access to the sensitive data to at least one corresponding access group.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
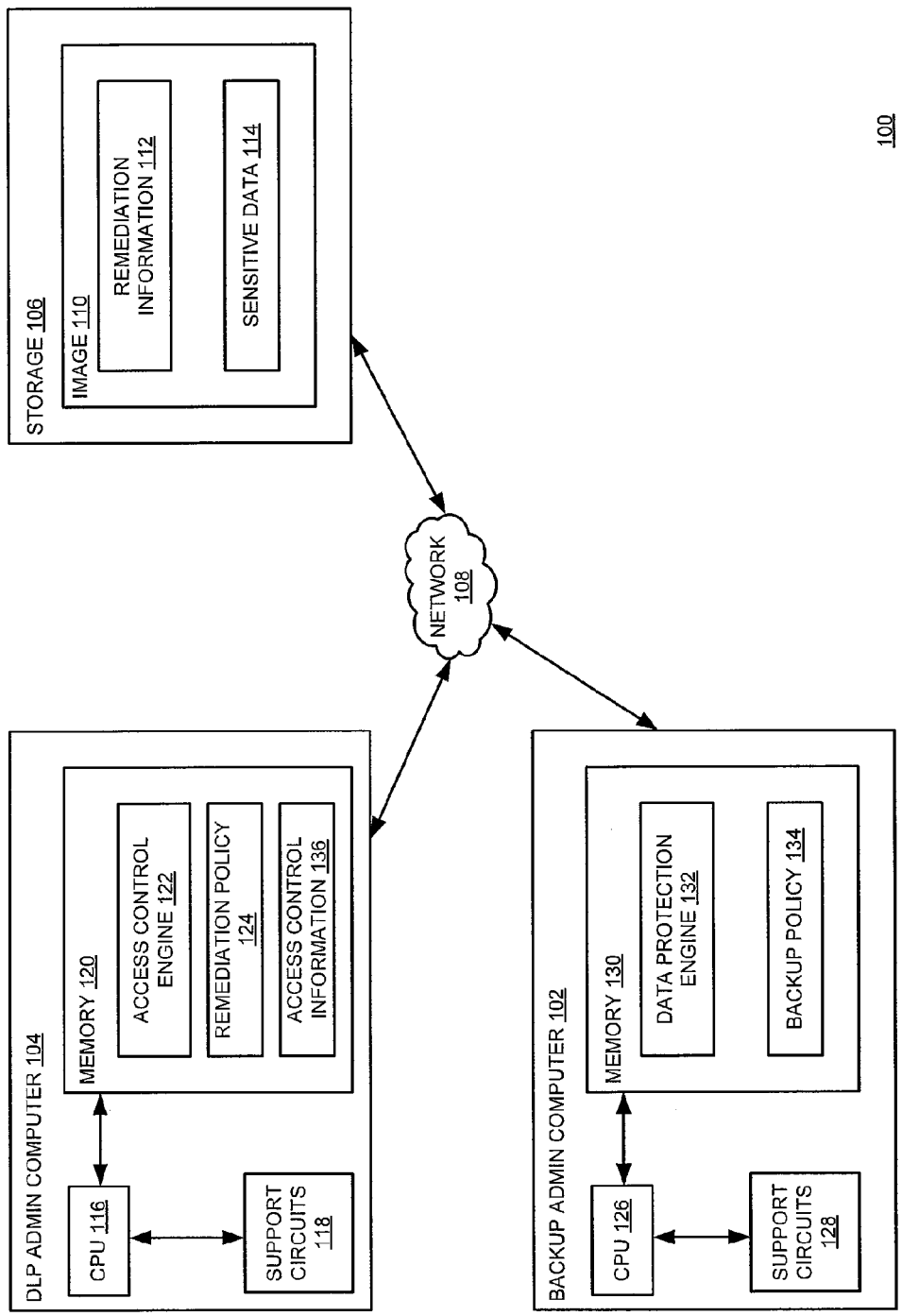
FIG. 1 is a block diagram of a system for facilitating sensitive data remediation from backup images without a separate data store in accordance with one or more embodiments of the invention.

FIG. 1 is a block diagram of a system 100 for facilitating sensitive data remediation from backup images without a separate data store according to one or more embodiments of the invention. The system 100 includes a backup admin computer 102, a DLP (data leakage prevention) admin computer 104 and storage 106, where each is coupled to other through a network 108.

The backup admin computer 102 is a type of computing device (e.g., a laptop, a desktop, a Personal Digital Assistant (PDA), a mobile phone and/or the like), such as those generally known in the art. The backup admin computer 102 includes a Central Processing Unit (CPU) 126, various support circuits 128 and a memory 130. The CPU 126 may comprise one or more commercially available microprocessors or microcontrollers that facilitate data processing and storage. The various support circuits 128 facilitate the operation of the CPU 126 and include one or more clock circuits, power supplies, cache, input/output circuits and the like. The memory 130 comprises at least one of Read Only Memory (ROM), Random Access Memory (RAM), disk drive storage, optical storage, removable storage and the like. The memory 130 includes various software packages, such as a data protection engine 132. The memory 130 further includes various data, such as a backup policy 134.

The DLP admin computer 104 is a type of computing device (e.g., a laptop, a desktop, a Personal Digital Assistant (PDA), a mobile phone and/or the like), such as those generally known in the art. The DLP admin computer 104 includes a Central Processing Unit (CPU) 116, various support circuits 118 and a memory 120. The CPU 116 may comprise one or more commercially available microprocessors or microcontrollers that facilitate data processing and storage. The various support circuits 118 facilitate the operation of the CPU 116 and include one or more clock circuits, power supplies, cache, input/output circuits and the like. The memory 120 comprises at least one of Read Only Memory (ROM), Random Access Memory (RAM), disk drive storage, optical storage, removable storage and the like. The memory 120 includes various software packages, such as an access control engine 122. The memory 120 further includes various data, such as a remediation policy 124 and access control information 136.

Generally, the storage 106 includes various components (i.e., hardware and software) that are configured to manage storage resources within a computing environment. The storage 106 generally includes one or more data storage devices (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) to the one or more data storage devices for one or more computing devices. The storage 106 facilitates access and preservation of backup images, such as an image 110. The image 110 includes sensitive data 114 and remediation information 112.

Generally, the network 108 comprises a communication system that connects computers by wire, cable, fiber optic and/or wireless link facilitated by various types of well-known network elements, such as hubs, switches, routers and the like. The network 108 may employ various well-known protocols to communicate information amongst the network resources. For example, the network 108 may be a part of the Internet or Intranet using various communications infrastructure, such as Ethernet, Wi-Fi, WiMax, General Packet Radio Service (GPRS) and the like.

Generally, the image 110 includes one or more data objects in various formats (e.g., emails, word documents, aggregate data types, spreadsheets and/or the like) for encapsulating and representing a hard disk, a block device, a virtual machine and/or a physical machine as a raw image. As an example, the image 110 may include one or more virtual image files, such as virtual hard disk (VHD) files, virtual machine disk (VMDK) files and/or the like. As another example, the image 110 may include one or more non-virtual machine image files, such as a disk image (.V2I) file created by SYMANTEC BackupExec software products.

According to various embodiments, the image 110 may be stored in the storage 106 as one or more backups (e.g., a full backup, an incremental backup, a differential backup and/or the like). For example, the one or more backups may include a full backup and one or more incremental backups of the image 110. Furthermore, an incremental backup of the image 110 includes one or more modified and/or added data blocks and indicates any deleted data blocks since a previous backup (e.g., a previous incremental backup or a base full backup).

In one or more embodiments, data objects within the image 110 may include the sensitive data 114. Generally, the sensitive data 114 includes confidential and/or privileged information, such as financial data, corporate data, e-discovery data, customer information, intellectual property and/or the like. For example, the sensitive data 114 may include customer information, such as a social security number, a credit card number, protected health information, personal identifiable information and/or the like stored within an organization. In one or more embodiments, the sensitive data 114 may include corporate data, such as financial data, mergers and acquisitions data, employee data, meeting recordings, engineering specifications, source code, trade secrets, defense plans, flow charts, simulation models, computer generated graphics and/or the like. As another example, the sensitive data 114 may include intellectual property data, such as source code, design documents, pricing and/or the like.

According to various embodiments, the image 110 includes the remediation information 112. The remediation information 112 may form a portion of metadata for the image 110. Generally, the metadata includes various information (i.e., attributes) associated with the data objects within the image 110, such as an Access Control List (ACL), a data object name, a size as well as time and date information regarding data object modification, access, creation and/or the like. Furthermore, the metadata may be organized as records (e.g., Master File Table (MFT) records), iNodes as well as any other file system structure. As such, the metadata of the image 110 includes an image remediation attribute and one or more data object remediation attributes.

In one or more embodiments, the remediation information 112 includes an image remediation attribute and/or one or more data object remediation attributes that restrict access to the image 110 and/or one or more data objects, respectively. The image remediation attribute indicates whether the image 110 is remediated. For example, the image 110 includes one or more remediated data objects if the image remediation attribute is set. The data object remediation attribute indicate whether a particular data object within the image 110 is remediated. In other words, the data object remediation attributes indicate one or more data objects within the image 110 that are remediated and include the sensitive data 114. For example, one or more data objects are remediated if the remediation attributes that are associated with the one or more data objects are set.

According to various embodiments, the remediation policy 124 defines access credentials of one or more access groups that correspond with various portions of the sensitive data 114 based on sensitivity. For example, a particular access group may include one or more DLP administrators. Hence, only the one or more DLP administrators may access a corresponding portion of the sensitive data 114. Furthermore, the one or more DLP administrators may access the data protection engine 132 to restore the corresponding portion of the sensitive data 114.

In one or more embodiments, the remediation policy 124 indicates various access groups and corresponding access credentials. Further, a particular access group within the remediation policy 124 may be specified by Globally Unique Identifier (GUID), User Identifier (UID) and/or the like. In other embodiment, the access credentials within the remediation policy 124 define various permissions for the corresponding access group. In other words, the access credentials may indicate one or more actions that the corresponding access groups may perform For example, the access credentials may permit reading a file, changing file contents (e.g., add, create, delete and/or modify data), executing the file and/or the like.

According to various embodiments, the access control information 136 includes mappings between one or more remediated data objects of the image 110 and one or more corresponding access groups. Furthermore, the access control information 136 is updated after remediating a particular data object during or after a backup process is performed on computer data. In one embodiment, the access control information 136 includes one or more reasons for remediating the particular data object.

According to various embodiments, the backup policy 134 is configured to define one or more data type for which a backup is required. In one embodiment, the backup policy 134 defines one or more backups that may be performed (e.g., an incremental backup, a full backup and/or the like). The backup policy 134 includes configuration parameters regarding backups of the image 110 by the data protection engine 132. For example, the backup policy 134 provides an option for scanning the backup images (e.g., the image 110) during a backup. As another example, the backup policy 134 provides another option for scanning the backup images after the backup is completed. In one embodiment, the backup policy 134 includes an optional feature for encrypting various portions of the sensitive data 114 during or after the backup of the image 110.

Generally, the access control engine 122 includes software code that is configured to prevent any accidental and/or intentional disclosure of sensitive data (e.g., the sensitive data 114). The access control engine 122 and the data protection engine 132 cooperate to restrict access to the sensitive data to one or more corresponding access groups. The access control engine 122 is configured to examine (i.e., scans) the image 110 in order to identify the sensitive data 114 and remediate one or more data objects. The access control engine 122 may scan the image 110 during a backup process that creates the image 110 or afterwards.

In operation, the access control engine 122 detects the sensitive data 114 within the one or more data objects. In one embodiment, the access control engine 122 modifies the remediation information 112 to identify the one or more remediated data objects and restrict access to one or more corresponding access groups. For example, the access control engine 122 configures the image remediation attribute of the image 110 as well as data objects remediation attributes of the one or more data objects. Optionally, the access control engine 122 encrypts the sensitive data 114 within the image 110.

As an example, a restore entity (e.g., a DLP administrator or an user within an organization) may request one or more data objects within one or more images (e.g., the image 110) to be restored. In one embodiment, the access control engine 122 cooperates with the data protection engine 134 to access backup images (i.e., metadata) and enumerate one or more remediated data objects using remediation attributes. In operation, the access control engine 122 examines the remediation information 112 within the image 110. In one embodiment, the access control engine 122 determines if an image remediation attribute is set. Further, if the image remediation attribute is set, then the access control engine 122 examines the remediation information 112 to identify one or more data object remediation attributes that are set. In another embodiment, the access control engine 122 examines the access control information 136 to identify one or more corresponding access groups of the remediated data objects. Subsequently, the access control engine 122 compares access credentials for the one or more corresponding access groups with access credentials of the restore entity.

In one or more embodiments, the access control engine 122 accesses the remediation policy 124 to identify the access credentials for the corresponding access groups. In other embodiment, the access control engine 122 compares the access credentials of the corresponding access groups with access credentials of the restore entity to control access to the one or more remediated data objects. For example, if the restore entity is an ordinary employee of the organization whose access credentials do not match the corresponding access groups, then the access control engine 122 denies access to the remediated data objects. Further, the access control engine 122 sends a message to the restore entity that indicates insufficient access credentials to restore the remediated data objects. As another example, if the restore entity is a DLP administrator having access credentials that match and/or exceed the access credentials of the corresponding access groups, then the access control engine 122 grants access to the remediated data objects. Optionally, the access control engine 122 decrypts the sensitive data 114.

Figure 2:
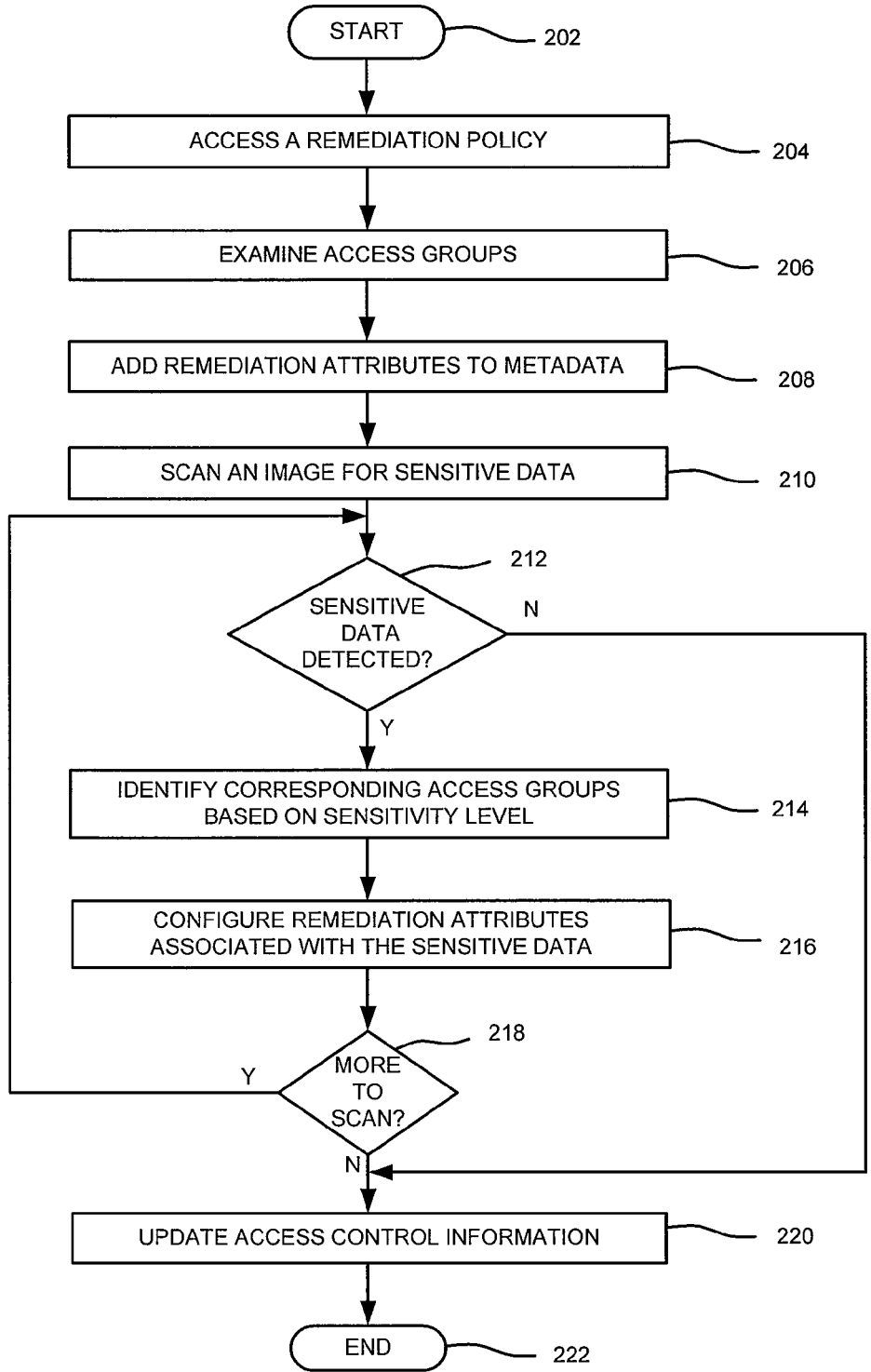
FIG. 2 is a flow diagram of a method for modifying remediation information that is associated with sensitive data in accordance with one or more embodiments of the invention.

FIG. 2 is a flow diagram of a method 200 for modifying remediation information that is associated with sensitive data according to one or more embodiments of the invention. The method 200 starts at step 202 and proceeds to step 204, at which a remediation policy (e.g., the remediation policy 124 of FIG. 1) is accessed. In one embodiment, the remediation policy defines access credentials for one or more access groups.

At step 206, the one or more access groups are examined. At step 208, remediation attributes are added to metadata of one or more backup images. According to one or more embodiments, the metadata of a backup image (e.g., the image 110 of FIG. 1) includes an image remediation and a remediation attribute for each and every data object. At step 210, the image is scanned for sensitive data (e.g., the sensitive data 114 of FIG. 1). At step 212, a determination is made as to whether the sensitive data is detected. If at the step 212, it is determined that sensitive data is not detected (option "NO"), then the method 200 proceeds to step 220. If at the step 212, it is determined that the sensitive data is detected (option "YES"), then the method 200 proceeds to step 214.

At the step 214, a corresponding access group is identified based on a sensitivity level that is associated with the sensitive data. At step 216, remediation attributes associated with the sensitive data are configured. For example, an image remediation attribute as well as one or more data object remediation attributes associated with an image and one or more data objects that comprise the sensitive data, respectively, are modified. At step 218, a determination is made as to whether there are more images to be scanned for the sensitive data. If at the step 218, it is determined that there are more images to be scanned (option "YES"), then the method 200 returns to the step 212. If at the step 218, it is determined that no more images are to be scanned (option "NO"), then the method 200 proceeds to step 220. At the step 220, access control information (e.g., the access control information of 136 FIG. 1) is updated. At step 222, the method 200 ends.

Figure 3:
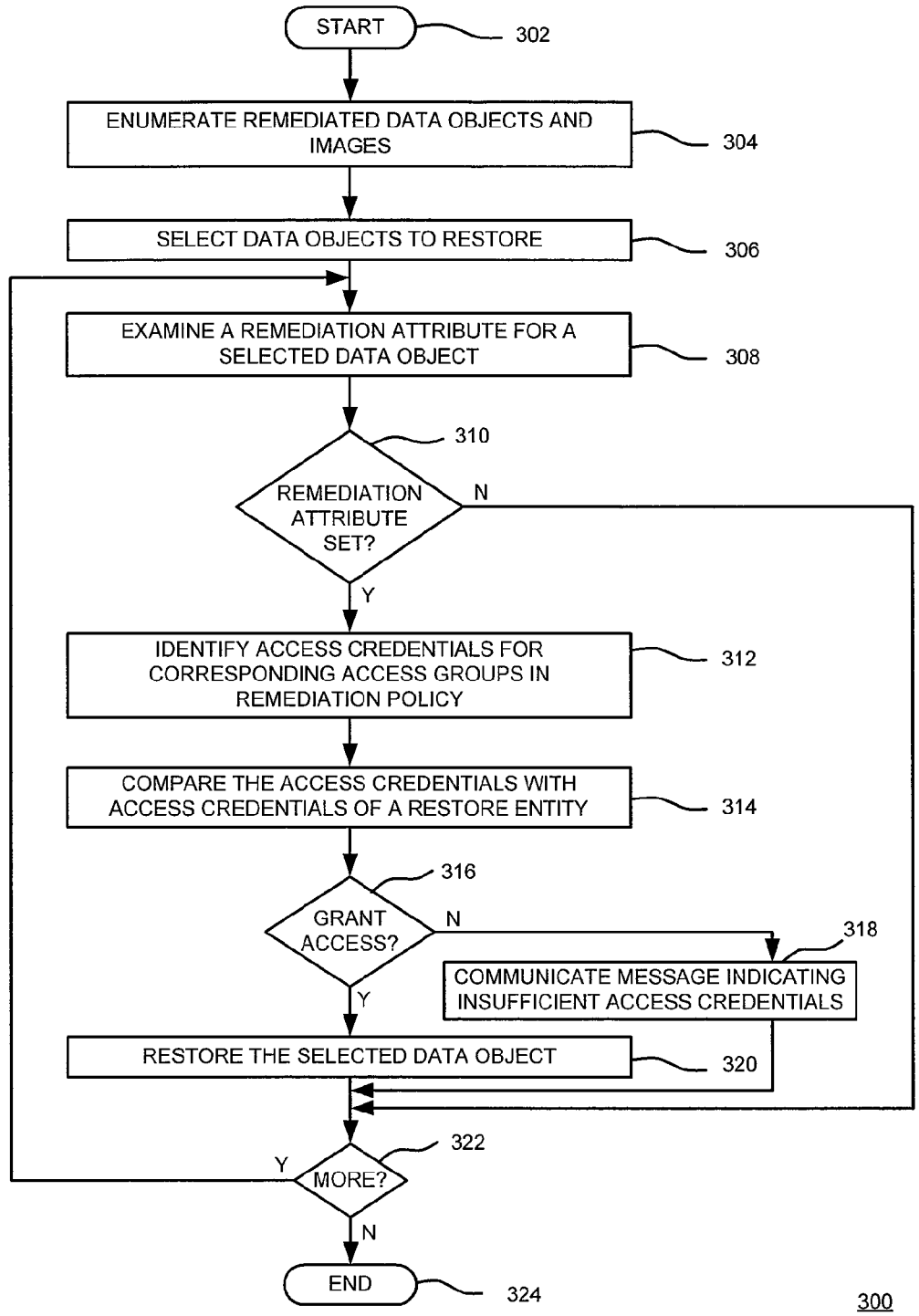
FIG. 3 is a flow diagram of a method for controlling access to remediated data objects in accordance with one or more embodiments of the invention.

FIG. 3 is a flow diagram of a method 300 for controlling access to remediated data objects according to one or more embodiments of the invention. The method 300 starts at step 302 and proceeds to step 304, at which remediated data objects are enumerated. In one embodiment, a user (i.e., a restore entity) may request restoration of one or more data objects of one or more images (e.g., the image 110 of FIG. 1). At step 306, the one or more data objects to be restored are selected. At step 308, a remediation attribute for a selected data object is examined.

At step 310, a determination is made as to whether the remediation attribute is set. If at the step 310, it is determined that the remediation attribute is not set (option "NO"), then the method 300 proceeds to step 322. If at step 310, it is determined that the remediation attribute is set (option "YES"), then the method 300 proceeds to step 312. In one embodiment, an access control engine determines access groups that correspond with the selected data object using access control information.

At step 312, access credentials for the corresponding access groups in a remediation policy (e.g., the remediation policy 124 of FIG. 1) are identified. For example, the access control engine accesses the remediation policy to identify the access credentials of the corresponding access groups. At step 314, the access credentials are compared with access credentials of the restore entity. In one embodiment, a comparison result is produced that controls access to the selected data object. As such, access is granted or denied based on the comparison result. At step 316, a determination is made as to whether access to the selected data object is granted. If at step 316, it is determined that the access is not granted (option "NO"), then the method 300 proceeds to step 318.

At step 318, a message, indicating insufficient access credentials, is communicated. For example, the access control engine communicates a message to the restore entity indicating that access credentials are insufficient to restore the selected data object. After step 318, the method 300 proceeds to step 322. If at step 316, it is determined that access is granted (option "YES"), then the method 300 proceeds to step 320. At step 320, the selected data object is restored. At step 322, a determination is made as to whether there are more data objects to be restored. If at the step 322, it is determined that there are more data objects to be restored (option "YES"), then the method 300 returns to the step 308. If at the step 322, it is determined that there are no more data objects to be restored (option "NO"), then the method 300 proceeds to step 324. At step 324, the method 300 ends.

Figure 4:
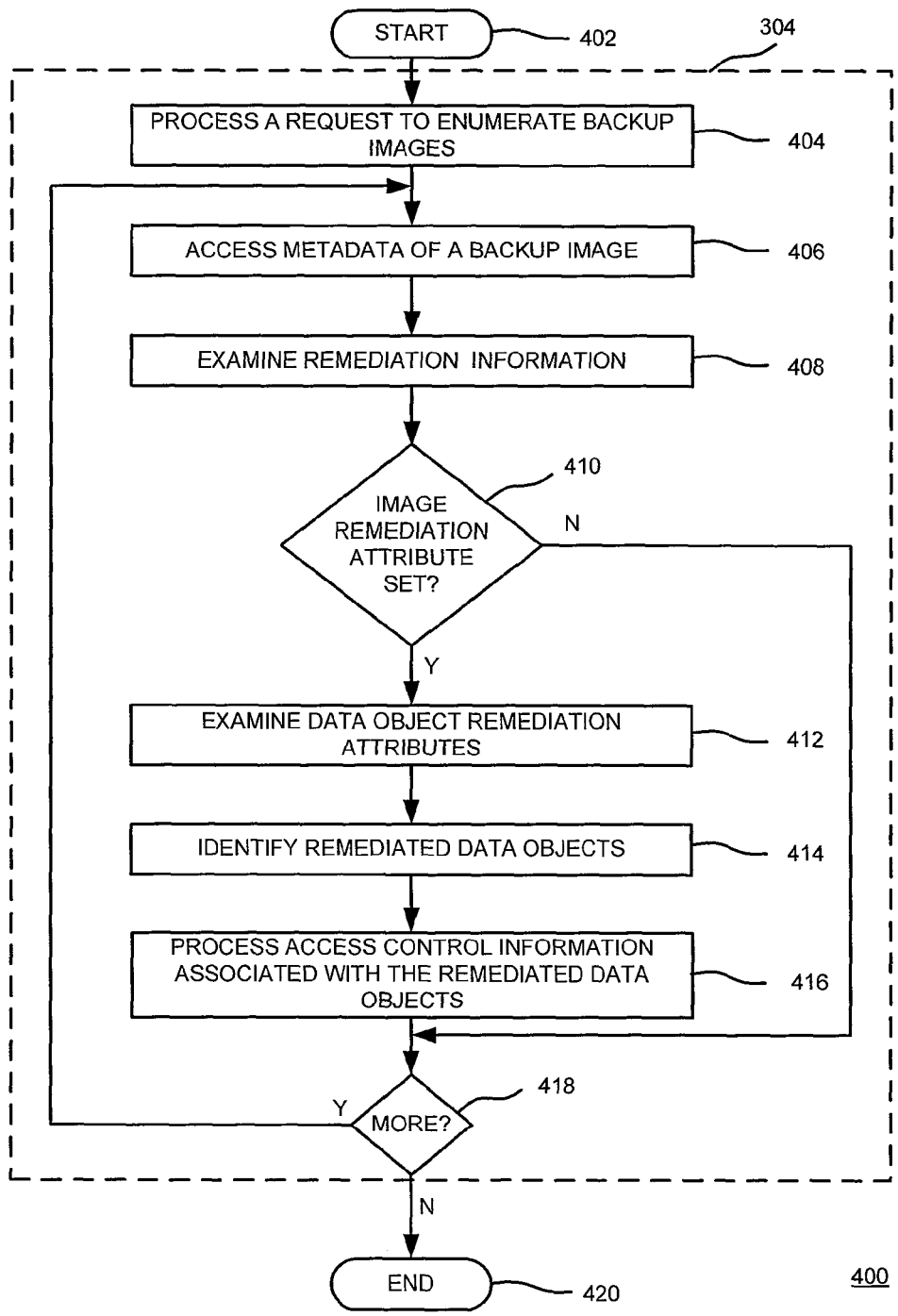
FIG. 4 is a flow diagram of a method for enumerating remediated data objects from backup images using remediation information in accordance with one or more embodiments of the invention.

FIG. 4 is a flow diagram of a method 400 for enumerating remediated data objects from backup images using remediation information according to one or more embodiments. In one embodiment, the method 400 includes one or more embodiments of the step 304 of the method 300. The method 400 starts at step 402 and proceeds to step 404, at which a request to enumerate backup images (e.g., the image 110 of FIG. 1) is processed. At step 406, metadata of a backup image of the backup images is accessed. As described herein, the metadata includes remediation information (e.g., the remediation information 112 of FIG. 1) that is associated with the backup image as well as one or more data objects within the backup image. At step 408, the remediation information is examined.

At step 410, a determination is made as to whether an image remediation attribute is set. If at step 410, it is determined that the image remediation attribute is not set (option "NO"), then the method 400 proceeds to step 418. If at step 410, it is determined that the image remediation attribute is set (option "YES"), then the method 400 proceeds to step 412. At step 412, one or more data object remediation attributes are examined. At step 414, the one or more remediated data objects are identified. At step 416, access control information (e.g., the access control information 136 of FIG. 1) associated with the one or more remediated data objects is processed. As described herein, the access control information indicates one or more access groups that correspond with the one or more remediated data objects.

At step 418, a determination is made as to whether there are more backup images to be enumerated. If at step 418, it is determined that there are more backup images to be enumerated (option "YES"), then the method 400 returns to the step 406. If, at step 418, it is determined that there are no more backup images to be enumerated (option "NO"), then the method 400 proceeds to step 420. At step 420, the method 400 ends.

While the foregoing is directed to embodiments of the present invention, other and further embodiments of the invention may be devised without departing from the basic scope thereof, and the scope thereof is determined by the claims that follow.

The invention claimed is:

1. A method comprising:
identifying sensitive data, wherein
the sensitive data is within a backup image,
the backup image comprises a plurality of data objects,
the sensitive data is stored within at least one of the plurality of data objects,
the backup image further comprises remediation information,
the remediation information comprises
an image remediation attribute, and
a data object remediation attribute for each of the plurality of data objects in the backup image, and
the remediation information further comprises access control information for the plurality of data objects;
in response to the identifying, modifying the remediation information, wherein
the modifying the remediation information comprises
modifying the image remediation attribute to indicate that one or more of the plurality of data objects in the backup image comprises the sensitive data, and
modifying the data object remediation attribute for the at least one of the plurality of data objects to indicate that the at least one of the plurality of data objects comprises the sensitive data;
examining the remediation information, wherein
the remediation information restricts access to the sensitive data to at least one corresponding access group;
identifying access credentials for the at least one corresponding access group; and
comparing access credentials of a restore entity with the access credentials of the at least one corresponding access group to produce a comparison result.

2. The method of claim 1, further comprising:
adding the image remediation attribute and the data object remediation attribute for the each of the plurality of data objects to the remediation information.

3. The method of claim 1, wherein the modifying the remediation information further comprises:
updating the access control information.

4. The method of claim 1, further comprising:
enumerating at least one remediated data object from the backup image.

5. The method of claim 1, further comprising:
controlling access to the sensitive data based on the comparison result.

6. The method of claim 5, further comprising:
permitting access to the sensitive data by the restore entity in response to matching the access credentials of the restore entity with the access credentials of the at least one corresponding access group.

7. The method of claim 5, further comprising:
preventing access to the sensitive data by the restore entity if the access credentials of the restore entity do not match the access credentials of the at least one corresponding access group.

8. The method of claim 1, further comprising:
identifying the at least one corresponding access group for the sensitive data based on sensitivity of the sensitive data.

9. The method of claim 1 further comprising:
encrypting the sensitive data to produce encrypted sensitive data; and
modifying the remediation information associated with each data object that comprises the encrypted sensitive data with a length and an offset of each portion of the encrypted sensitive data.

10. A non-transitory computer readable storage medium comprising program instructions executable to:
identify sensitive data, wherein
the sensitive data is within a backup image, the backup image comprises a plurality of data objects,
the sensitive data is stored within at least one of the plurality of data objects,
the backup image further comprises remediation information,
the remediation information comprises
an image remediation attribute, and
a data object remediation attribute for each of the plurality of data objects in the backup image, and
the remediation information further comprises access control information for the plurality of data objects;
modify the remediation information in response to identifying the sensitive data, wherein
the program instructions executable to modify the remediation information are further executable to:
modify the image remediation attribute to indicate that one or more of the plurality of data objects in the backup image comprises the sensitive data, and
modify the data object remediation attribute for the at least one of the plurality of data objects to indicate that the at least one of the plurality of data objects comprises the sensitive data;
examine the remediation information, wherein
the remediation information restricts access to the sensitive data to at least one corresponding access group;
identify access credentials for the at least one corresponding access group; and
compare access credentials of a restore entity with the access credentials of the at least one corresponding access group to produce a comparison result.

11. The non-transitory computer-readable storage medium of claim 10, wherein the program instructions are further executable to:
add the image remediation attribute and the data object remediation attribute for the each of the plurality of data objects to the remediation information.

12. The non-transitory computer-readable storage medium of claim 10, wherein the program instructions are further executable to:
update the access control information.

13. The non-transitory computer-readable storage medium of claim 10, wherein the program instructions are further executable to:
enumerate at least one remediated data object from the backup image.

14. The non-transitory computer-readable storage medium of claim 10, wherein the program instructions are further executable to:
permit access to the sensitive data by the restore entity in response to the comparison result indicating that the access credentials of the restore entity matches the access credentials of the at least one corresponding access group.

15. The non-transitory computer-readable storage medium of claim 10, wherein the program instructions are further executable to:
prevent access to the sensitive data by the restore entity in response to the comparison result indicating that the access credentials of the restore entity do not match the access credentials of the at least one corresponding access group.

16. A system comprising:
one or more processors; and
memory coupled to the one or more processors, wherein the memory stores program instructions executable by the one or more processors to:
identify sensitive data, wherein
the sensitive data is within a backup image,
the backup image comprises a plurality of data objects,
the sensitive data is stored within at least one of the plurality of data objects,
the backup image further comprises remediation information,
the remediation information comprises
an image remediation attribute, and
a data object remediation attribute for each of the plurality of data objects in the backup image, and
the remediation information further comprises access control information for the plurality of data objects,
modify the remediation information in response to identifying the sensitive data,
wherein
the program instructions executable to modify the remediation are further executable to:
modify the image remediation attribute to indicate that one or more of the plurality of data objects in the backup image comprises the sensitive data, and
modify the data object remediation attribute for the at least one of the plurality of data objects to indicate that the at least one of the plurality of data objects comprises the sensitive data,
examine the remediation information, wherein
the remediation information restricts access to the sensitive data to at least one corresponding access group,
identify access credentials for the at least one corresponding access group, and
compare access credentials of a restore entity with the access credentials of the at least one corresponding access group to produce a comparison result.

17. The system of claim 16, wherein the program instructions are further executable to:
update the access control information.

* * * * *